3,741,967
PHTHALAZINE DERIVATIVES
Elvio Bellasio, Albate, Italy, assignor to Gruppo Lepetit S.p.A., Milan, Italy
No Drawing. Filed Mar. 3, 1970, Ser. No. 16,239
Int. Cl. C07d 51/06
U.S. Cl. 260—250 A                          3 Claims

ABSTRACT OF THE DISCLOSURE

New 2,3-dihydro-1H-pyrazolo(1,2-b)phthalazine - 1,5-(10H)-diones and 3,4-dihydropyridazino(1,2 - b)phthalazine-1(2H),6(11H)-diones and process for the manufacture thereof. The compounds have anti-inflammatory activity.

---

This invention relates to certain new phthalazine derivatives which are useful anti-inflammatory agents and to chemical methods for producing same. More particularly the invention relates to compounds, which can be represented by the formula

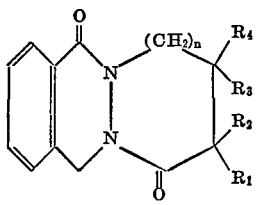

wherein $n$ is an integer from 0 to 1, $R_1$ is hydrogen and lower alkyl, $R_3$ is hydrogen, $R_2$ and $R_4$ are members of the class consisting of hydrogen, lower alkyl and aryl, or $R_1$ and $R_3$ taken together represent an additional bond. In accordance with the invention the above described compounds are prepared by condensing a phthalazinone of the formula

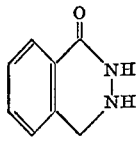

with an acyl chloride of the formula

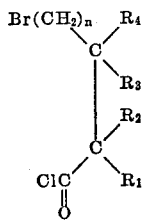

wherein $n$, $R_1$, $R_2$, $R_3$ and $R_4$ have the above significance, in an organic solvent in the presence of an organic nitrogen base. As an alternative, the compounds can be obtained by reacting α-bromo-toluoyl chloride of the formula

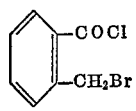

with a heterocycle of the formula

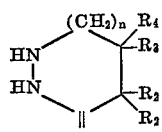

the symbols $n$, $R_1$, $R_2$, $R_3$ and $R_4$ having the above significance, in an organic solvent, in the presence of an organic nitrogen base.

Besides the phthalazines, the preparation of which is described in detail later on in the examples, still other representative compounds, that can be prepared according to the above processes, are the following:

2,3-dihydro-3,3-dipropyl-1H-pyrazolo[1,2-b]phthalazine-1,5(10H)-dione
3-butyl-2,3-dihydro-3-phenyl-1H-pyrazolo[1,2-b]phthalazine-1,5(10H)-dione
2-butyl-2,3-dihydro-3-methyl-3-phenyl-1H-pyrazolo[1,2-b]phthalazine-1,5(10H)-dione
2,3-dihydro-3,3-diphenyl-1H-pyrazolo[1,2-b]phthalazine-1,5(10H)-dione
2,3-dihydro-2-phenyl-3,3dipropyl-1H-pyrazolo[1,2-b]phthalazine-1,5(10H)-dione
3-ethyl-1H-pyrazolo[1,2-b]phthalazine-1,5(10H)-dione
3-butyl-1H-pyrazolo[1,2-b]phthalazine-1,5(10H)-dione
3-phenyl-1H-pyrazolo[1,2-b]phthalazine-1,5(10H)-dione
3,4-dihydro-3,3-dipropylpyridazino[1,2-b]phthalazine-1(2H),6(11H)-dione
3,4-dihydro-3-methyl-3-phenylpyridazino[1,2-b]phthalazine-1(2H),6(11H)-dione
2,2-diethyl-3,4-dihydro-3-phenylpyridazino[1,2-b]phthalazine-1(2H),6(11H)-dione
2,2-dibutyl-3,4-dihydro-3-methyl-3-phenylpyridazino[1,2-b]phthalazine-1(2H),6(11H)-dione
2-butyl-3,4-dihydro-3,3-diphenylpyridazino[1,2-b]phthalazine-1(2H),6(11H)-dione In both processes the two reactants are contacted in equimolecular amounts or using a slight excess up to 10% of the acyl chloride. The organic base is present in an excess, which is not critical and is preferably comprised between 2 and 2.5 mole for each mole of the acyl chloride. Likewise the temperature can be varied considerably, as long as the reaction mixture is heated sufficiently to effect and to maintain complete solution of the starting materials. In most instances, a temperature between 40° C. and the boiling temperature of the reaction mixture is sufficient to ensure the completion of the reaction during a 2–6 hours interval.

As stated in the foregoing the compounds of the invention possess a high anti-inflammatory activity. Experiments carried out on rats according to Winter et al., Proc. Soc. Exp. Biol. Med. 111, 544 (1962) in order to evaluate said activity, showed that some representatives of the class inhibited the carrageenin induced edema to the same extent as the known anti-inflammatory agent phenylbutazone, used at the same doses. On the other hand the acute toxicity per os in mice is 1.5 to 3 times lower than that of phenylbutazone, for which reason their therapeutic indexes are largely favourable, when compared with the index of said known compounds.

The phthalazine derivates are of value in the treatment of arthritic disorders in warmblooded animals and in like conditions giving response to anti-inflammatory agents. For these purposes they are preferably administered orally, in the form of conventional pharmaceutical compositions, such as tablets, dragees, capsules, or solutions, suspensions, emulsions, when the liquid form of administration is preferred. Anyway still the other usual routes can be usefully employed. For instance a good absorption is observed by administering the drug by rectal route in the form of suppositories, together with a pharmaceutically acceptable carrier.

The amounts of the compound to be used for medical purposes, depend upon many factors, such as the specific compound employed, the particular type and severity of the disease: the reaction sensitivity of the patient, the method of the administration etc. When the drug is given orally, a daily dosage range of 50–1500 mg. can be prescribed.

The invention is illustrated by the following examples.

EXAMPLE 1

2,3-dihydro-1H-pyrazolo[1,2-b]phthalazine-1,5(10H)-dione

An amount of 5.92 g. of 3,4-dihydro-1(2H)-phthalazinone is dissolved in 150 ml. of dioxane. The solution is cooled at 15° C. then 6.84 g. of 3-bromopropionyl chloride in 30 ml. of dioxane are added dropwise followed by 10 g. triethylamine in 20 ml. of the same solvent. A suspension is formed, which is heated at 50° C. for 5 hours, then is allowed to cool and filtered. The filtrate is evaporated to dryness in vacuo and the obtained residue is taken up with a mixture of chloroform and water. The organic phase is separated, washed with dilute hdyrochloric acid, then with a solution of sodium carbonate and finally with water. The chloroform is distilled off and the residue is crystallized from ethyl acetate. Yield 5.25 g. (65.0%) of 2,3-dihydro-1H-pyrazolo[1,2-b]phthalazine-1,5(10H)-dione; M.P. 114–116° C.

Analysis.—Calculated for $C_{11}H_{10}N_2O_2$ (percent): C, 65.33; H, 4.98; N, 13.86. Found (percent): C, 65.26; H, 5.10; N, 13.70.

EXAMPLE 2

2,3-dihydro-2-phenyl-1H-pyrazolo[1,2-b]phthalazine-1,5(10H)-dione

To a solution of 4.6 g. of 3,4-dihydro-1(2H)-phthalazinone in 150 ml. of chloroform, cooled at 0° C., 7.7 g. of 3-bromo-2-phenylpropionyl chloride in 50 ml. of chloroform are slowly added, followed by 7.5 g. of triethylamine in 50 ml. of the same solvent. The mixture is refluxed for 2.5 hours, allowed to stand overnight, then filtered. The mixture is washed successively with water, with 10% hydrochloric acid, saturated sodium carbonate solution and again with water. The organic phase is dried over sodium sulphate and concentrated to dryness. The residue is crystallized from absolute ethanol. Yield 5.18 g. (60%) of 2,3 - dihydro-2-phenyl-1H-pyrazolo[1,2-b]phthalazine-1,5-(10H)-dione; M.P. 160–161° C.

Analysis.—Calculated for $C_{17}H_{14}N_2O_2$ (percent): C, 73.36; H, 5.07; N, 10.07. Found (percent): C, 73.35; H, 5.22; N, 9.83.

EXAMPLE 3

2-butyl-2,3-dihydro-1H-pyrazolo[1,2-b]phthalazine-1,5(10H)-dione

To a solution of 1.48 g. of 3,4-dihydro-1(2H)-phthalazinone in 45 ml. of benzene, cooled at 15° C., 2.27 g. of 3-bromo-2-butylpropionyl chloride in 10 ml. of benzene are slowly added at 0–5° C., followed by 2.42 g. of triethylamine in 10 ml. of the same solvent. The mixture is heated for 2.5 hours at 50° C., filtered and washed first with 10% hydrochloric acid, then with saturated aqueous sodium carbonate and finally with water. The organic phase is separated, dried over sodium sulphate and concentrated to dryness in vacuo. The residue consisting of 2-butyl-2,3-dihydro - 1H - pyrazolo[1,2-b]-phthalazine-1,5(10H)-dione is recrystallized from diethyl ether. Yield 7.43 g. (72.0%); M.P. 108–110° C.

Analysis.—Calculated for $C_{15}H_{18}N_2O_2$ (percent): C, 69.74; H, 7.02; N, 10.85. Found (percent): C, 69.53; H, 7.22; N, 10.96.

EXAMPLE 4

2-butyl-2,3-dihydro-2-phenyl-1H-pyrazolo[1,2-b]phthalazine-1,5-(10H)-dione

Prepared substantially according to the method described in Examples 1 to 3 from 2.22 g. of 3,4-dihydro-1(2H)-phthalazinone and 4.5 g. of 3-bromo-2-butyl-2-phenylpropionyl chloride. Yield 3.38 g. (67.5%); M.P. 140–142° C.

Analysis.—Calculated for $C_{21}H_{22}N_2O_2$ (percent): C, 75.42; H, 6.63; N, 8.38. Found (percent): C, 75.61; H, 6.80; N, 8.35.

EXAMPLE 5

3,4-dihydropyridazino[1,2-b]phthalazine-1(2H),6(11H)-dione

Prepared substantially as described in Examples 1 to 3 from 2.96 g. of 3,4-dihydro-1(2H)-phthalazinone and 3.72 g. of 4-bromobutyryl chloride. Yield 2.99 g. (69.3%); M.P. 103–104° C.

Analysis.—Calculated for $C_{12}H_{12}N_2O_2$ (percent): C, 66.65; H, 5.59; N, 12.96. Found (percent): C, 66.78; H, 5.73; N, 12.76.

EXAMPLE 6

2-butyl-3,4-dihydropyridazino[1,2-b]phthalazine-1(2H),6(11H)-dione

Prepared substantially as described in Examples 1 to 3 from 2.96 g. of 3,4-dihydro-1(2H)-phthalazinone and 4.82 g. of 4-bromo-2-butylbutyryl chloride. Yield 3.86 g. (71.0%); M.P. 59–61° C.

Analysis.—Calculated for $C_{16}H_{20}N_2O_2$ (percent): C, 70.56; H, 7.40; N, 10.29. Found (percent): C, 70.38; H, 7.57; N, 9.98.

EXAMPLE 7

3,4-dihydro-2-phenylpyridazino-[1,2-b]phthalazine-1(2H),6(11H)-dione

Prepared substantially as described in Examples 1 to 3 from 2.96 g. of 3,4-dihydro-1(2H)-phthalazinone and 5.22 g. of 4-bromo-phenylbutyryl chloride. Yield 3.82 g. (65.4%); M.P. 148–150° C.

Analysis.—Calculated for $C_{18}H_{16}N_2O_2$ (percent): C, 73.95; H, 5.52; N, 9.58. Found (percent): C, 74.13; H, 5.63; N, 9.44.

EXAMPLE 8

2,2-dibutyl-3,4-dihydropyridazino[1,2-b]phthalazine-1(2H),6(11H)-dione

Prepared substantially as described in Examples 1 to 3 from 1.9 g. of 3,4-dihydro-1(2H)-phthalazinone and 3.6 g. of 4-bromo-2,2-dibutylbutyryl chloride. Yield 2.77 g. (65.8%); M.P. 60° C.

Analysis.—Calculated for $C_{20}H_{28}N_2O_2$ (percent): C, 73.13; H, 8.59; N, 8.53. Found (percent): C, 72.60; H, 8.57; N, 8.34.

EXAMPLE 9

2,3-dihydro-3-phenyl-1H-pyrazolo[1,2-b]phthalazine-1,5(10H)-dione

To 12.96 g. of 5-phenyl-3-pyrazolidinone in 200 ml. of dioxane a solution of 19.56 g. of α-bromo-o-toluoyl chloride in 40 ml. of dioxane is added, while stirring, at 10–15° C., followed after 30 minutes by 18.15 g. of triethylamine. The mixture is heated at 65° C. for 4 hours, then allowed to cool and filtered. The filtrate is concentrated to dryness, the residue is taken up with chloroform, washed with water, and the chloroform phase concentrated to dryness. The residue is recrystallized from ethanol 95%. Yield 20.0 g. (89.9%); M.P. 129–131° C.

Analysis.—Calculated for $C_{17}H_{14}N_2O_2$ (percent): C, 73.36; H, 5.07; N, 10.07. Found (percent): C, 73.44; H, 5.16; N, 10.30.

EXAMPLE 10

2,3-dihydro-3-methyl-1H-pyrazolo[1,2-b]phthalazine-1,5(10H)-dione

Prepared substantially as described in Example 9 starting from 10 g. of 5-methyl-3-pyrazolidinone and 25.7 g. of α-bromo-o-toluoyl chloride. Yield 13.5 g. (62.5%); B.P. 195° C./0.5 mm. Hg.

Analysis.—Calculated for $C_{12}H_{12}N_2O_2$ (percent): C, 66.65; H, 5.59; N, 12.96. Found (percent): C, 65.95; H, 5.65; N, 13.10.

EXAMPLE 11

2,3-dihydro-3-(p-methoxyphenyl)-1H-pyrazolo[1,2-b]phthalazine-1,5(10H)-dione

Prepared substantially as described in Example 9, starting from 11.5 g. of 5-(p-methoxyphenyl)-3-pyrazolidinone and 15.1 g. of α-bromo-o-toluoyl chloride. Yield 13.5 g. (73.2%); M.P. 120–121° C.

*Analysis.*—Calculated for $C_{18}H_{16}N_2O_3$ (percent): C, 70.11; H, 5.23; N, 9.09. Found (percent): C, 70.25; H, 5.32; N, 9.03.

EXAMPLE 12

2,3-dihydro-3-methyl-2-phenyl-1H-pyrazolo[1,2-b]phthalazine-1,5(10H)-dione

Prepared substantially as described in Example 9, starting from 5.17 g. of 5-methyl-4-phenyl-3-pyrazolidinone and 7 g. of α-bromo-o-toluoyl chloride. Yield 5.5 g. (64.1%); M.P. 135–137° C.

*Analysis.*—Calculated for $C_{18}H_{16}N_2O_2$ (percent): C, 73.95; H, 5.92; N, 9.83. Found (percent): C, 73.72; H, 5.82; N, 9.68.

EXAMPLE 13

2,3-dihydro-2-methyl-3-phenyl-1H-pyrazolo[1,2-b]phthalazine-1,5(10H)-dione

Prepared substantially as described in Example 9, from 7 g. of 4-methyl-5-phenyl-3-pyrazolidinone and 9.8 g. of α-bromo-o-toluoyl chloride. Yield 8.0 g. (61.0%); M.P. 101–103° C.

*Analysis.*—Calculated for $C_{18}H_{16}N_2O_2$ (percent): C, 73.95; H, 5.52; N, 9.58. Found (percent): C, 73.85; H, 5.43; N, 9.70.

EXAMPLE 14

1H-pyrazolo[1,2-b]phthalazine-1,5(10H)-dione

Prepared substantially as described in Example 9 from 8.4 g. of 2-pyrazolin-5-one and 23.3 g. of α-bromo-o-toluoyl chloride. Yield 12.1 g. (60.5%); M.P. 180–182° C.

*Analysis.*—Calculated for $C_{11}H_8N_2O_2$ (percent): C, 65.99; H, 4.02; N, 13.99. Found (percent): C, 64.99; H, 4.02; N, 13.88.

EXAMPLE 15

2-methyl-1H-pyrazolo[1,2-b]phthalazine-1,5(10H)-dione

Prepared substantially as described in Example 9 from 4.9 g. of 4-methyl-3-pyrazolin-5-one and 11.6 g. of α-bromo-o-toluoyl chloride. Yield 7.2 g. (67.1%); M.P. 166–168° C.

*Analysis.*—Calculated for $C_{12}H_{10}N_2O_2$ (percent): C, 67.26; H, 4.70; N, 13.07. Found (percent): C, 68.18; H, 4.60; N, 12.84.

EXAMPLE 16

2-butyl-1H-pyrazolo[1,2-b]phthalazine-1,5(10H)-dione

Prepared substantially as described in Example 9 from 1.55 g. of 4-butyl-3-pyrazolin-5-one and 2.6 g. of α-bromo-o-toluoyl chloride. Yield 2.07 g. (73.2%); M.P. 165–167° C.

*Analysis.*—Calculated for $C_{15}H_{16}N_2O_2$ (percent): C, 70.28; H, 6.29; N, 10.92. Found (percent): C, 70.85; H, 6.33; N, 10.71.

EXAMPLE 17

2-phenyl-1H-pyrazolo[1,2-b]phthalazine-1,5(10H)-dione

Prepared substantially as described in Example 9 from 8 g. of 4-phenyl-3-pyrazolin-5-one and 11.6 g. of α-bromo-o-toluoyl chloride. Yield 8.06 g. (58.4%); M.P. 257–260° C.

*Analysis.*—Calculated for $C_{17}H_{12}N_2O_2$ (percent): C, 73.89; H, 4.37; N, 10.13. Found (percent): C, 73.53; H, 4.47; N, 10.18.

We claim:

1. A compound of the formula

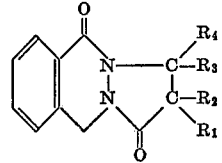

wherein $R_1$ is hydrogen or lower alkyl, $R_3$ is hydrogen, $R_2$ and $R_4$ are each a member of the class consisting of hydrogen, lower alkyl and phenyl, or $R_1$ and $R_3$, taken together, represent an additional bond.

2. A compound as in claim 1, wherein the phthalazine derivative is 2,3-dihydro-2-methyl-3-phenyl-1H-pyrazolo-[1,2-b]phthalazine-1,5(10H)-dione.

3. A compound as in claim 1, wherein the phthalazine derivative is 2,3-dihydro-3-phenyl - 1H - pyrazolo[1,2-b]phthalazine-1,5(10H)-dione.

References Cited
UNITED STATES PATENTS 3,433,641  3/1969  Margot _____ 260—250 A
3,557,108  1/1971  Bellasio et al. _____ 260—250 A NICHOLAS S. RIZZO, Primary Examiner U.S. Cl. X.R.

424—250

UNITED STATES PATENT OFFICE
CERTIFICATE OF CORRECTION

Patent No. 3,741,967                    Dated June 26, 1973

Inventor(s) ELVIO BELLASIO

It is certified that error appears in the above-identified patent and that said Letters Patent are hereby corrected as shown below:

In the heading, column 1, after line 6, insert

-- Claim Priority, Italy  13667A/69  March 5, 1969 -- .

Signed and sealed this 22nd day of January 1974.

(SEAL)
Attest:

EDWARD M. FLETCHER, JR.                RENE D. TEGTMEYER
Attesting Officer                      Acting Commissioner of Patents